United States Patent Office 3,396,164
Patented Aug. 6, 1968

3,396,164
NAPHTHOXAZINONES
Uberto Teotino and Davide Della Bella, Milan, Italy, assignors to Whitefin Holdings S.A., Lugano, Switzerland
No Drawing. Filed Jan. 7, 1966, Ser. No. 522,340
Claims priority, application Great Britain, Jan. 28, 1965, 3,845/65
7 Claims. (Cl. 260—244)

ABSTRACT OF THE DISCLOSURE

Halogen-substituted dihydronaphtho-1,3-oxazine-4-ones of the formula

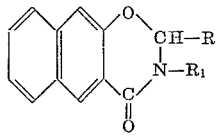

wherein R is a haloalkyl of from 1 to 4 carbon atoms and $R_1$ is hydrogen or a lower alkyl are prepared by reacting in an acidic organic solvent medium a hydroxy-carbamido-naphthalene of the formula

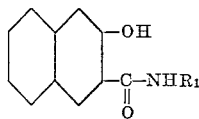

wherein $R_1$ is as defined above, with a compound of the formula A–X wherein A is —CHO, —CH(OCH$_2$—CH$_3$)$_2$ or —CH(OCH$_3$)$_2$ and X is halophenyl or a haloalkyl of 1 to 4 carbon atoms. The 2-halo-substituted dihydronaphtho-1,3-ozazine-4 one products have therapeutic applications.

---

This invention relates to novel chemical compounds having valuable pharmacological properties and to the methods for producing the same. More particularly, this invention is concerned with new naphthoxazinones, processes for producing such compounds, and pharmaceutical uses of the same.

According to the present invention there are provided novel compounds having the formula:

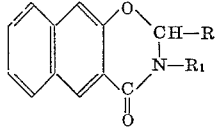

in which R is a haloalkyl with from 1 to 4 carbon atoms or a haloaryl radical, and $R_1$ is hydrogen or a lower alkyl radical.

The compounds of the present invention may be manufactured by reacting 3-hydroxy-2-carbamido-naphthalene or a 3-hydroxy-2-(N-lower alkyl)-carbamido-naphthalene with a carbonyl compound of the formula A–X where A is CHO, CH(OCH$_2$CH$_3$)$_2$, or CH(OCH$_3$)$_2$, and X is haloalkyl with from 1 to 4 carbon atoms, a haloaryl or an alkylene with 2 to 4 carbon atoms radical, in the presence of an organic solvent and of an organic or inorganic acid: when X is an alkylene radical with from 2 to 4 carbon atoms, the presence of a gaseous hydrogen halide is also necessary.

The above mentioned organic or inorganic acids to be used in the reaction, must have such characteristics as to act as a ring formation catalyst; in the case A=—CHO the acid must also act as dehydrating agent. We have found that, in order to comply with the above requirements, the mineral acids, such as H$_2$SO$_4$, HCl and the like, are the most suitable. In the case X is an alkylene, with from 2 to 4 carbon atoms, and then the reaction is carried out in the presence of a hydrogen halide gas which adds to the double bond of the alkylene-derivative in order to form the corresponding haloalkyl derivative, no further addition of mineral acid is needed. When the reaction according to the present invention is carried out by condensing 3-hydroxy-2-carbamido-naphthalene or 3-hydroxy-2-(N-lower alkyl)-carbamido-naphthalene with an acetal, it may be advantageous to operate also in the presence of an alcohol-binding agent, such as glacial acetic acid.

Glacial acetic acid is also one of the preferred organic solvents and then it may explicate the function only of solvent, when free aldehydes are used, or the double function of solvent and of alcohol-binding agent when acetals are reacted.

The temperature at which the carbonyl compound is added to 3-hydroxy-2-carbamido-naphthalene or to its N-lower alkyl derivative, is dependent upon the particular carbonyl compound used and may range from about 0° C. to the refluxing temperature of the solvent used.

The reaction is then completed by stirring the reaction mixture at a temperature of from 30° C. to the refluxing temperature of the solvent used, preferably of from 50° C. to 80° C.

The time required for completing the reaction may vary from 30 minutes to about 12 hours, this being somewhat dependent upon the carbonyl compound used, as well as on the temperature.

The compounds of the present invention are useful as therapeutic agents owing to their high antiexudative, anti-inflammatory, antipyretic and analgesic activities and to their low toxicity.

The anti-inflammatory and antiexudative activity was tested in rats on plantar oedema by ovalbumin and cotton pellet granuloma; doses of 25–50 mg./kg. of all derivatives, given per os via gastric tube, proved significantly effective, this being mostly evident for the 2-(p-chloro)-phenyl-2,3-dihydro-naphtho-1,3-oxazin-4-one. Alike results are obtained in adrenalectomized animals.

Antipyretic properties were evaluated in rats made hypothermic by parenteral administration of yeast, and appeared to be possessed to a significant extent by all derivatives, among which 2-(p-chloro)-phenyl-2,3-dihydro-naphtho-1,3-oxazin-4-one proved far outstanding. Furthermore the same compound appeared provided with good analgesic properties.

Toxicological data are quite favourable; a single oral dose higher than 2 g./kg. proved to be tolerated, in particular a daily administration of 0.5 g./kg. of 2-(p-chloro)-phenyl-2,3-dihydro-naphtho-1,3-oxazin-4-one given orally for a 6-week period, did not cause any hematological alteration or gastric lesion.

The compounds of this invention may be administered orally or rectally and may be associated with a solid carrier in any of the suitable pharmaceutical forms such as tablets, capsules or supositories.

For example, a composition suitable to prepare tablets for oral use is the following one:

1375 g. of 2-(p-chloro)-phenyl-2,3-dihydronaphtho-1,3-oxazin-4-one, 137.5 g. of starch, 27.5 g. of sodium-laurylsulphonate and 220 g. of lactose were mixed with 500 cc. of water and 38.5 g. of gelatin. The mixture was screened to produce granules of suitable size, and dried.

To these ingredients were added 99 g. of dried starch, 77 g. of talc and 33 g. of magnesium stearate.

The materials were mixed and tableted using standard equipment and procedures for this purpose, into tablets weighing 365 m. each.

The compounds of the present invention and the processes for preparing them are illustrated but not limited by the following examples:

Example 1.—2 chloromethyl-2,3-dihydro-naphtho-1,3-oxazin-4-one 400 cc. of glacial acetic acid were saturated with dry hydrogen chloride gas at about +5° C. 18.8 g. (0.1 M) of 3-hydroxy-2-carbamido-naphthalene were added thereto and the resulting mixture was heated, with stirring, to 50° C. Into this mixture were dropped, with stirring, 24 g. (0.15 M) of alpha-chloro-acetaldehyde-diethylacetal. After stirring for one hour at 50° C. and for three hours at 65° C., the brown and clear solution was cooled and then poured into a stirred water-ice mixture. The precipitate was collected by suction, washed with water to neutrality and then with sodium hydroxide to remove unreacted 3-hydroxy-2-carbamido-naphthalene. Thereafter the raw product was washed with water to neutrality and dried at 50° C. in vacuo. Yield=26 g. The dry product was recrystallized from 2-butanone. M.P.=201°–203° C.

Analysis.—Calculated for $C_{13}H_{10}ClNO_2$: C=63.04; H=4.7; N=5.65; O=12.92; Cl=14.32. Found: C=63.04; H=4.23; N=5.65; O=12.90; Cl=14.32.

Example 2.—2-bromoethyl-2,3-dihydro-naphtho-1,3-oxazin-4-one

The procedure of example 1 was repeated by reacting 18.8 g. (0.1 M) of 3-hydroxy-2-carbamido-naphthalene with 24 g. (0.12 M) of alpha-bromo-acetaldehyde-diethylacetal. M.P.=162°–164.5° C.

Analysis.—Calculated for $C_{13}H_{10}BrNO_2$: C=53.45; H=3.45; N=4.79; O=10.96; Br=27.35. Found: C=53.68; H=3.55; N=4.66; O=11.16; Br=27.24.

Example 3.—2-(beta-chloro)-ethyl-2,3-dihydro-naptho-1,3-oxazin-4-one 400 cc. of glacial acetic acid were saturated with dry hydrogen chloride at about +5° C. 18.8 g. (0.1 M) of 3-hydroxy-2-carbamido-naphthalene were added thereto, maintaining the temperature below +5 C. Into this mixture were dropped, with stirring, 6.8 g. (0.125 M) of acrolein precooled to 0° C., allowing the temperature to rise up to 25° C. The mixture was heated to 50° C., and thereto were added 6.8 g. (0.125 M) of acrolein precooled to 0° C. After stirring for two hours at 50° C., the mixture was cooled and poured into 800 cc. of a water-ice mixture. The precipitate was collected by suction, washed with water to neutrality and dried at 50° C. in vacuo. Yield=13.2 g. The dry product was recrystallized from ethyl alcohol. M.P.=186° to 187° C.

Analysis.—Calculated for $C_{14}H_{12}ClNO_2$: C=64.25; H=4.62; N=5.35; O=12.23; Cl=13.55. Found: C=63.99; H=4.81; N=5.50; O=12.29; Cl=13.45.

Example 4.—2-(beta-chloro)-propyl-2,3-disydro-naptho-1,3-oxazin-4-one 400 cc. of glacial acetic acid were saturated with dry hydrogen chloride gas at about +5° C. Thereto were added, with stirring, 18.8 g. (0.1 M) of 3-hydroxy-2-carbamido-naphthalene and thereafter 8 g. (0.11 M) of crotonaldehyde. During this step the temperature was kept below +5° C. The resulting mixture was heated to 60° C. and stirred for one hour and a half. After addition of 1.8 g. (0.025 M) of crotonaldehyde, the mixture was stirred, while hydrogen chloride was passed through for 30 minutes at 60° C. The mixture was cooled and poured into a stirred water-ice mixture. The precipitate was collected by suction, washed with water to neutrality and dried at 50° C. in vacuo. Yield=26.8 g. The dry product was purified by recrystallization from 2-butanone. M.P.=147°–148° C.

Analysis.—Calculated for $C_{15}H_{14}ClNO_2$: C=65.34; H=5.12; N=5.08; O=11.60; Cl=12.86. Found: C=65.48; H=5.18; N=4.93; O=11.56; Cl=12.75.

Example 5.—2-(p-chloro)-phenyl-2,3-dihydro-naptho-1,3-oxazin-4-one 18.8 g. (0.1 M) of 3-hydroxy-2-carbamido-naphthalene, 15.00 g. (0.1 M) of p-chlorobenzaldehyde, 1 g. of concentrated sulphuric acid, and 400 cc. of anhydrous benzene were refluxed, with stirring, for ten hours. The water formed by the condensation reaction was separated in a water trap. The resulting mixture was cooled. The precipitate was collected by filtration and washed with 5% NaOH. After washing with water to neutrality, the precipitate was dried in vacuo at 50° C. Yield=14.60 g. The dry product was recrystallized from trichloromethane. M.P.=250°–252° C.

Analysis.—Calculated for $C_{18}H_{12}ClNO_2$: C=69.8; H=3.9; N=4.52; O=10.33; Cl=11.44. Found: C=69.69; H=3.89; N=4.71; O=10.53; Cl=11.38.

Example 6.—2-(p-chloro)-phenyl-2,3-dihydro-naphtho-1,3-oxazin-4-one 750 g. (4 M) of 3-hydroxy-2-carbamido-naphthalene and 745 g. (4 M) of p-chlorobenzaldehyde dimethylacetal were dissolved in 1000 cc. of dimethyl formamide at 65° C. Into this solution was dropped, under stirring, a solution of 40 cc. of $H_2SO_4$ conc. and 250 cc. of dimethyl formamide. During the addition the temperature of the reaction mixture is gradually raised to 80° C. and the mixture was kept under stirring. After the addition was completed, the mixture was maintained at 80° C. and further stirred for one hour and a half. After cooling to −5° C. the precipitate was filtered off by suction, washed with methyl and dried under vacuum. Yield=622 g. By concentration of the filtrate, further 54 g. of product were extracted. The product was purified by crystallization from dimethyl formamide. M.P.=250°–252° C.

Example 7.—2-(o-chloro)-phenyl-2,3-dihydro-naphtho-1,3-oxazin-4-one 18.80 g. (0.1 M) of 3-hydroxy-2-carbamido-naphthalene and 18.80 g. (0.1 M) of o-chlorobenzaldehyde dimethylacetal were dissolved in 30 cc. of dimethylformamide at 80° C. Into the solution was dropped, under stirring, a solution of 1 cc. of $H_2SO_4$ conc. and 6 cc. of dimethylformamide. After addition was completed, the reaction mixture was heated to 90° C. and stirred for two hours. After cooling to about −5° C. the precipitate was filtered off by suction, washed with methyl ether and dried under vacuum. The raw product was purified by crystallization from dimethyl formamide. M.P.=213°–215° C. (with decomposition).

We claim:

1. A compound having the formula:

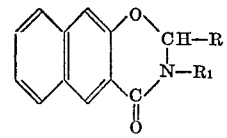

wherein R is selected from the group consisting of haloalkyl of from 1 to 4 carbon atoms and halaphenyl, and $R_1$ is selected from the group consisting of hydrogen and lower alkyl.

2. 2 - chloromethyl-2,3-dihydro-naphtho-1,3-oxazin-4-one.

3. 2 - bromomethyl-2,3-dihydro-naphtho-1,3-oxazin-4-one.

4. 2 - (beta-chloro) - ethyl-2,3-dihydro-naphtho-1,3-oxazin-4-one.

5. 2 - (beta - chloro)-propyl-2,3-dihydro-naphtho-1,3-oxazin-4-one.

6. 2 - (p. chloro)-phenyl - 2,3-dihydro-naphtho-1,3-oxazin-4-one.

7. 2 - (o-chloro) - phenyl - 2,3-dihydro-naphtho-1,3-oxazin-4-one.

References Cited

UNITED STATES PATENTS 2,943,087   6/1960   Ohnacker et al. _____ 260—244

HENRY R. JILES, *Primary Examiner.*

ROBERT T. BOND, *Assistant Examiner.*